US009130701B2

(12) United States Patent
Manssour

(10) Patent No.: US 9,130,701 B2
(45) Date of Patent: Sep. 8, 2015

(54) METHOD AND ARRANGEMENT FOR NETWORK-CODED BIDIRECTIONAL RELAYING

(75) Inventor: Jawad Manssour, Stockholm (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 306 days.

(21) Appl. No.: 13/885,429

(22) PCT Filed: Nov. 16, 2010

(86) PCT No.: PCT/SE2010/051254
§ 371 (c)(1),
(2), (4) Date: May 15, 2013

(87) PCT Pub. No.: WO2012/067553
PCT Pub. Date: May 24, 2012

(65) Prior Publication Data
US 2013/0235733 A1  Sep. 12, 2013

(51) Int. Cl.
H04L 12/26  (2006.01)
H04L 1/00  (2006.01)
H04J 1/16  (2006.01)
H04B 7/15  (2006.01)

(52) U.S. Cl.
CPC ............ *H04L 1/0009* (2013.01); *H04B 7/15* (2013.01); *H04L 1/0003* (2013.01); *H04L 1/0007* (2013.01); *H04L 1/0025* (2013.01); *H04L 1/0076* (2013.01); *H04L 2001/0097* (2013.01)

(58) Field of Classification Search
CPC .......................................................... H04B 7/15
See application file for complete search history.

(56) References Cited

U.S. PATENT DOCUMENTS

2010/0128622 A1*  5/2010  Horiuchi et al. ............. 370/252
2010/0203826 A1*  8/2010  Xue et al. ..................... 455/9
2010/0246708 A1     9/2010  Horiuchi et al.

FOREIGN PATENT DOCUMENTS

EP          2207274 A1      7/2010
EP          2216954 A1      8/2010
WO       2006071187 A2      7/2006

OTHER PUBLICATIONS

Liu, J. et al. "Superimposed XOR: A New Physical Layer Network Coding Scheme for Two-Way Relay Channels." IEEE Global Telecommunications Conference 2009, Nov. 30, 2009, pp. 1-6.
Park, J.M. et al. "Hierarchically Modulated Network Coding for Asymmetric Two-Way Relay Systems." IEEE Transactions on Vehicular Technology, vol. 59, No. 5, Jun. 2010, pp. 2179-2184.
(Continued)

*Primary Examiner* — Edan Orgad
*Assistant Examiner* — Rebecca Song
(74) *Attorney, Agent, or Firm* — Murphy, Bilak & Homiller, PLLC

(57) ABSTRACT

The present invention relates to coded multidirectional relaying in a network communication system. By sending information about the processing (610, 724, 736, 818, 822) and modulation (742, 828) of data, performed in a network coding node (104, 200, 404, 504), to a first (102, 300, 402, 502) and second (106, 300, 406, 506) network decoding nodes, network decoding can be correctly performed by the first and second network decoding nodes in general and not just for special communication cases.

16 Claims, 10 Drawing Sheets

(56) References Cited

OTHER PUBLICATIONS

Ahlswede, R. et al. "Network Information Flow." IEEE Transactions on Information Theory, Jul. 2000, pp. 1204-1216, vol. 46, Issue 4.

Oh, Jinyoung et al., "Rate Control for Sum-rate Maximization in Wireless Network Coding", IEEE Vehicular Technology Conference, Fall 2009, Sep. 20, 2009, 1-5.

\* cited by examiner

METHOD AND ARRANGEMENT FOR NETWORK-CODED BIDIRECTIONAL RELAYING

TECHNICAL FIELD

This invention pertains in general to the field of network coding. More particularly the invention relates to coded multidirectional relaying.

BACKGROUND

Network Coding, NC, is an area of networking which recently has gained interest. Network Coding concerns manipulation of data at one or more nodes intermediate to a sending node and a receiving node within a network, to improve, for example, throughput, delay, and robustness. In particular, NC allows the nodes to recombine several input packets of data into one or several output packets. At the intermediate nodes, linear coding is performed on the available packets, and the resulting encoded packets are broadcasted to separate receiving nodes simultaneously rather than transmitting to each node separately.

A major application area of network coding is bidirectional relaying. Bidirectional relaying refers to the case where two end-users, here denoted U1 and U2 have data, here denoted s1 and s2, respectively, want to exchange their information via a third node R, which plays the role of a relaying node.

In general, network coding applied to bidirectional relaying in systems is referred to as coded bidirectional relaying.

In order to exchange data between two end-users U1 and U2 connected to a third node, a total of 4 transmissions is needed when applying conventional bidirectional relaying to complete the data exchange.

The first transmission transfers data s1 from end-node U1 to R. The second transmission forwards data s1 from R to end-node U2. The third transmission transfers data s2 from end-node U2 to node R, and the fourth transmission forwards data s2 from node R to end-node U1.

If applying coded bidirectional relaying in network coding of data between two end-nodes connected by a third node R, it is sufficient with a total of 3 transmissions in order to complete the data exchange.

Bidirectional relaying may be performed on data bits by using bit-level network coding, or on complex data by using multi-domain network coding on the symbol level. Depending on whether bit-level or multi-domain network coding is performed, different processing at, at least one of the nodes will have to be carried out, as described hereinafter.

By applying bit-level network coding end-node U1 transmits data s1 to node R and end-node U2 transmits data s2 to node R. At node R data s3 is formed according to s3=s1 XOR s2, where XOR is a bitwise XOR operation. Node R then transmits data s3 to end-node U1 and U2. End-node U1 already knowing data s1, now performs network decoding of data s3 and calculates s1 XOR s3=s1 XOR (s1 XOR s2)=(s1 XOR s1) XOR s2=0 XOR s2=s2. End-node U2 similarly calculates s2 XOR (s2 XOR s1)=(s2 XOR s2) XOR s1=s1. End-nodes U1 and U2 have thus obtained exchanged data from a total of three transmissions. The network decoding step here undoes the network coding.

Of course, XOR is not the only network coding possible, but other types of coding may be used instead. The most important is that these codes have the property that if we have data s1 and a combination of data s1 and data s2, we obtain data s2, or if we have data s2 and a combination of data s1 and data s2, we obtain data s1.

Whereas bit-level network coding operates on bits, multi-domain network coding operates on symbols that are complex in nature. Transmission using multi-domain network coding resembles transmission on the bit-level. In fact the first steps are the same. Firstly, data s1 is transmitted from end-node U1 to node R. Secondly, data s2 is transmitted from end-node U2 to node R. At node R multi-domain network coded data s3 is created based on received data s1 and data s2. The created network coded data s3 is then transmitted to both end-nodes U1 and U2. At end-nodes U1 and U2 the coded data s3 can be network decoded by using a priori known data s1 or data s2, revealing data s2 or data s1, respectively.

Compared to bit-level network coding, multi-domain network coding is performed on the symbol of modulated information. Multi-domain network coding has an advantage compared to bit-level network coding in that symbols that are coded together may have different modulations, where each modulation is suited to the link on which they will be transmitted.

In summary, using coded bidirectional relaying requires a total of three transmissions to perform the data exchange as opposed to the four transmissions as required by conventional bidirectional relaying. One transmission out of four transmissions is therefore saved. This results in a capacity gain of up to 4/3, apart from the fact that only one transmission has to be performed by the node R to transmit data that represents data s1 and data s2.

In the case node R is a base station, and the end-nodes are User Equipments, the base station is only required to transmit once instead of two times, and therefore saves half the power needed to transmit data, as compared to conventional data transmission.

There are however drawbacks with prior art bidirectional network coding as will be pointed out down below.

Consider the communication system of two end-users U1 and U2 connected to each other via the node R. FIG. 1 schematically illustrates such a system.

Denote the Up-link channel between end-user U1 102 and node R 104, the U1 Up-link channel or U1 UL. Also, denote the Up-link channel between end-user U2 106 and node R 104, the U2 Up-link channel or U2 UL. Similarly, denote the Down-link channel between node R 104 and end-user U1 102, U1 Down-link channel or U1 DL. In addition, denote the Down-link channel between node R 104 and end-user U2 106, U2 Down-link channel or U2 DL.

The data of U1 102 will thus have to be transmitted using the U1 UL channel and the U2 DL channel. Similarly, the data of U2 106 will have to be transmitted using the U2 UL channel and the U1 DL channel.

The two Up-Link channels and the two Down-Link channels are typically different, and will consequently allow carrying different amounts of information.

Variations and/or differences between channel qualities of separate links can significantly affect systems employing network coding.

In the following examples limitations and hence the disadvantages of prior art techniques will be described.

Prior Art Disadvantage Example 1

Firstly, assume that the Up-link channel between end-node U1 and node R, i.e. U1 UL is able to support 16 Quadrature Amplitude Modulation (QAM). Secondly, assume that the Up-link channel between end-node U2 and node R, i.e. U2 UL is able to support 64 QAM.

Using 16QAM modulation means that each transmitted symbol on this UL from end-user U1 to node R can contain 4 bits per symbol, e.g. D1=1001, whereas using 64 QAM each transmitted symbol from end-user U2 to node R can contain 6 bits per symbol, e.g. D2=110101.

However, due to fading, dynamic interference and that the frequencies used for UL and DL transmission are different, the U1 UL may be different from U1 DL, and U2 UL may be different from U2 DL.

Therefore, assume that the Down-link channel between end-user U1 and node R, U1 DL can support a Quadrature Phase Shift Keying (QPSK), and that the DL between end-user U2 and node R, U2 DL can support 16 QAM. This means that each transmitted symbol from node R to end-user U1 can contain 2 bits, and each transmitted symbol from node R to end-user U2 can contain 4 bits.

Prior to transmission, the node R 104 will choose a Modulation and Coding Scheme (MCS) that satisfies the weakest link of U1 DL and U2 DL, which in this case is QPSK of U1 DL with a certain code rate.

It can be noted that a variation in the code rate will simply lead to a variation in the number of bits to be modulated and transmitted. In the rest of this description, the code rate is explicitly removed from the description but it is implicitly assumed that the number of bits sent for modulation is affected by the code rate of a given link.

Now, only 2 bits out of the 4 bits that U1 sent in UL, and 2 bits out of 6 bits that U2 sent in UL, can be network coded together.

To perform the network decoding operation, one could assume that the network decoding nodes U1 and U2 would use their transmitted data in U1 UL and U2 UL, respectively.

Consequently, U1 will use D1, i.e. 4 bits per symbol and U2 will use D2, i.e. 6 bits per symbol for network decoding. This network decoding operation will hence yield an erroneous result.

Prior Art Disadvantage Example 2

As in example 1 above, the communication system comprises the end-users U1 and U2 connected via the node R. Assume that the U1 UL channel is able to support a QPSK modulation, whereas the U2 UL channel supports a 16 QAM.

This means that each symbol in U1 UL corresponds to 2 bits, e.g. D1=10, and each symbol in U2 UL corresponds to 4 bits, e.g. D2=1011.

However, due to for example frequency selectivity, U1 UL is different from U1 DL and U2 UL is different from U2 DL. So assume that U1 DL supports a 16QAM modulation corresponding to 4 bits per symbol, and U2 DL supports a 64QAM modulation corresponding to 6 bits per symbol.

According to prior art, the node R will choose to transmit the network coded data with a MCS that can be correctly recovered by the weakest link from the relay to the end nodes. In this case, this corresponds to a modulation of 16QAM to satisfy U1 DL. This means that the network coded data will consist of 4 bits sent by U1 to node R and 4 bits sent by U2 to node R. Although this is not a problem for U2 as it sent 4 bits to node R during its UL transmission, the node R only has 2 bits transmitted from U1 during its UL transmission. Prior art network coding would typically attempt solving this problem by inserting zeros, i.e. zero padding, to the data received from U1 in its UL transmission. However, zero padding is not optimal from a capacity perspective and would not optimally utilize the network's resources. Such a network coding would thus be suboptimal.

As network coding reduces the number of required transmissions in a bidirectional exchanging system, a gain in capacity should be expected. However, due to the demonstrated erroneous and/or inefficient network coding examples, a straight forward application of network coding is unable or insufficient to achieve correct or optimal network coding in the case the of asymmetric channels.

There is thus a need to overcome the prior art disadvantages.

SUMMARY

The present invention seeks to mitigate, alleviate or eliminate one or more of the above-identified deficiencies in the prior art and disadvantages singly or in any combination and solves at least the above mentioned problems by providing a network coding node and a network decoding node as well as methods therein according to the appended patent claims.

An object of the present invention is thus to provide correct network coding and decoding in general and not only for specific communication cases.

According to one aspect of the present invention, there is provided a method in a network coding node for network coding in a communication system is disclosed. The network coding node for the method is configured for multi-directional communication with at least a first and a second network decoding node. Within said system the uplink channel between the first network decoding node and the network coding node, and between the second network decoding node and the network coding node, has a first and a second Channel Quality Measure, CQM, respectively. The downlink channel between the network coding node and the first network decoding node, and between the network coding node and the second decoding node has a fourth and a third CQM, respectively. The method comprises receiving first data coded and modulated based on the first CQM, and second data coded and modulated based on the second CQM, and comparing the first and the second CQM with at least one of the third and the fourth CQM. Thereafter processing of the received first and second data based on the comparison of the first and the second CQM with at least one of the third and the fourth CQM, respectively, is performed. Network coded data is obtained by performing a network coding of the processed first data with the processed second data, after which the network coded data is sent and to the first and second network decoding nodes. Also, information about the processing of the first and the second data is sent to the first and the second network decoding node, respectively.

Said processing may also comprise performing segmentation of the first data to the third CQM, if the first CQM is higher than the third CQM, and/or segmentation of the second data to the fourth CQM, if the second CQM is higher than the fourth CQM.

Said processing may also comprise performing concatenation of the first data and first backlog data when the first CQM is lower than the third CQM, wherein the first backlog data is previously received from the first network decoding node and stored at the network coding node.

Said concatenation may also be based on whether the first backlog data is delay tolerant or delay intolerant.

Said concatenation of first data and delay intolerant first backlog data, may also comprise prioritizing delay intolerant first backlog data before the first data, and wherein performing concatenation of first data and delay tolerant first backlog data, comprises prioritizing the first data before the delay tolerant first backlog data.

Said concatenation may also comprise concatenation of the second data and second backlog data, when the second CQM is lower than the fourth CQM, wherein the second backlog data is previously received from the second network decoding node and stored at the network coding node.

Said concatenation may also be based on whether the second backlog data is delay tolerant or delay intolerant.

Said concatenation may also comprise concatenation of the second data and the delay intolerant second backlog data, comprises prioritizing the delay intolerant second backlog data before the second data, and wherein performing concatenation of the second data and the delay tolerant second backlog data, comprises prioritizing the second data before the delay tolerant second backlog data.

Said comparing may also comprise comparing the first CQM and the second CQM with the minimum of the third and fourth CQMs, and wherein processing comprises processing the received first and second data based on the comparison of the first CQM and the second CQM, respectively, with the minimum of the third CQM and the fourth CQM.

Said processing may also comprise performing segmentation of the first or the second, in the case the first or the second CQM, respectively, is higher than the minimum of the third and the fourth CQMs.

Said processing may also comprise performing concatenating the first data with first backlog data or the second data with second backlog data in the case the first or the second CQM, respectively, is lower than the minimum of the third and the fourth CQMs, wherein the first or second backlog data is previously received from the first or second network decoding node, respectively, and stored at the network coding node.

Said processing may also comprise performing zero-padding the received first or second data to the minimum of the third and the fourth CQM, if the first or second CQM, respectively, is lower than the minimum of the third and the fourth CQMs.

Said comparing may also comprise comparing the first CQM with the second CQM, where processing comprises processing the first and the second data based on the comparison of the first CQM and the second CQM, when the first and the second CQMs are lower than the minimum of the third and the fourth CQM.

Said processing may also comprise concatenating the first data with first backlog data to the second CQM in presence of first backlog data in the case the first CQM is lower than the second CQM wherein the first backlog data is previously received from the first network decoding node and stored at the network coding node.

Said processing may also comprise zero-padding the first data to the second CQM in the case the first CQM is lower than the second CQM.

According to another aspect of the present invention, there is provided a method in a network decoding node for network decoding in a communication network, wherein the network decoding node is in communication with at least one network coding node, and wherein the uplink channel between the network decoding node and the network coding node has a first CQM. The method comprises sending to the network coding node first data coded and modulated based on the first CQM, and receiving from the network coding node information about processing the first data by the network coding node. Also the method comprises processing first data according to received information about processing the first data by the network coding node, and receiving network coded data from the network coding node. In addition, the method comprises obtaining second data by performing a network decoding operation of the received network coded data using the processed first data.

The method in a network decoding node may also comprise coding and modulating the first data according to information from the network coding node on how the first data is coded and modulated by the network coding node, and wherein the network decoding operation of the network coded data, uses the coded and modulated first data.

The method in a network decoding node may also comprise receiving information from the network coding node on how second data is being coded and modulated in the network coding node, and decoding and demodulating the obtained second data, based on received decoding and demodulation information.

The method in a network decoding node may also comprise receiving information from the network coding node on how the network coded data is coded and modulated in the network coding node, and demodulating the encoded data according to received demodulation information.

The network decoding operation within the method in a network decoding node may also comprise a bitwise XOR operation.

According to still another aspect of the present invention, there is provided a network coding node for multidirectional communication with at least a first and a second network decoding node in a communication system, where the network coding node is configured for network coding in the communication system, wherein the uplink channel between the first network decoding node and the network coding node, and between the second network decoding node and said network coding node, has a first and a second Channel Quality Measure, CQM, respectively, and wherein the downlink channel between the network coding node and the first network decoding node, and the network coding node and the second network decoding node, has a fourth and a third CQM, respectively. The network coding node comprises a transceiver that is configured to receive first data coded and modulated based on the first CQM, and second data coded and modulated based on the second CQM. The network coding node further comprises a data processing unit operatively connected to the transceiver, and configured to compare the first and the second CQM with at least one of the third and the fourth CQM, and to process the first and second data based on the comparison of the first and second CQM with at least one of the third and the fourth CQM. The network coding node also comprises an encoding unit operatively connected to the data processing unit and to the transceiver, and configured to obtain network coded data by performing a network encoding operation of the processed first data with the processed second data. The transceiver is further configured to send the network coded data to the first and the second network decoding nodes, and to send information about the processing of the first and second data to the first and second network decoding node, respectively.

The network coding node may also comprise any of a User Equipment, UE, a base station and a relay node.

According to still yet another aspect of the present invention, there is provided a network decoding node for network decoding in a communication network, the network decoding node being configured for communication with at least one network coding node, wherein the uplink channel between the network decoding node and the network coding node has a first CQM. The network decoding node comprises a transceiver that is configured to send to the network coding node first data coded and modulated based on the first CQM, and to receive from the network coding node information about processing the first data. The network decoding node further comprises a data processing unit operatively connected to the transceiver and configured to process the first data according to received information about processing the first data. The network decoding node also comprises a decoding unit operatively connected to the transceiver and the data processing unit, and configured to obtain second data by performing a network decoding operation of the received network coded data, using the processed first data.

The network decoding node any also comprise any one of a User Equipment, UE, a base station and a relay node.

Embodiments of the present invention come with the following advantages:

By providing a generic method for supporting coded multidirectional relaying in asymmetric channel conditions, a correctly functioning communication system under general and not only specific conditions is provided.

It is an advantage that embodiments ensure correct detection, network decoding and signal retrieval are possible, thus enhancing the system reliability.

It is a further advantage that embodiments allow an efficient usage of the transmission channels through choosing suitable Modulation and Coding Schemes, MCS, thereby increasing the system throughput.

BRIEF DESCRIPTION OF DRAWINGS

These and other aspects, features and advantages of which the invention is capable of, will be apparent and elucidated from the following description of embodiments of the present invention, reference being made to the accompanying drawings, in which FIG. 1 schematically illustrates a bidirectional system.

ABBREVIATIONS

Figure 1:
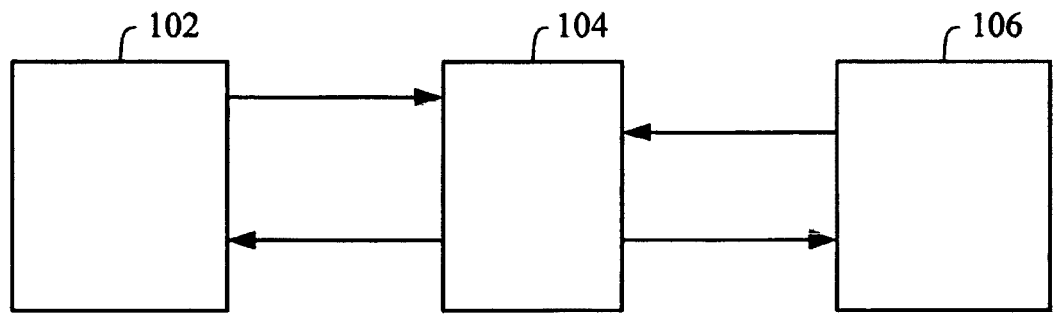

CQM Channel Quality Measure
eNB Evolved NodeB
NC Network Coding
MCS Modulation and Coding Scheme
OFDMA Orthogonal Frequency Division Multiple Access
QAM Quadrature Amplitude Modulation
QPSK Quadrature Phase Shift Keying
LTE Long Term Evolution
UE User Equipment

DETAILED DESCRIPTION

The basic concept of the invention relates to adapting the processing at a network coding node of a system employing network coding to suit varying Channel Quality Measures (CQMs), for communicating information related to these CQMs to corresponding network decoding nodes, and to allow these network decoding nodes to use the communicated information to ensure correct cancellation of a priori known information, and thereby correct processing and decoding, revealing desired data.

The present invention relates to bit-level network coding and multi-domain network coding. It also relates to network decoding on the bit-level and in the multi-domain.

Referring to the first of two network coding and decoding examples as sketched above in the background section, a correct network coding and decoding will now be presented.

In the first example, U1 UL and U2 UL supports 4 and 6 bits per symbol, respectively. In the downlink, U1 DL and U2 DL supports 2 and 4 bits per symbol, respectively.

This means that only 2 bits out of the 4 bits that U1 sent in UL, and 2 bits out of 6 bits that U2 sent in UL, can be network coded together by the node R or network coding node 104.

The network coding node 104 now sends information about the processing of the 2 out of 4 bits to the first network decoding node 102, and information about processing of 2 out of 6 bits to the second network decoding node 106. Also, the network coding node 104 sends coding and modulation information to the first and second decoding nodes, here in the form of that coding and modulation is performed using QPSK, i.e. supporting 2 bits per symbol.

After sending the coded and modulated network coded data to the first and second network decoding nodes, said network decoding nodes can now correctly network decode and process the received data, and retrieve the desired second and first data, respectively.

A correct decoding operation involves the bits that were network coded at the network coding node 104, and not all bits transmitted by the first and second network decoding node U1 and U2, respectively, Further down, a more detailed description of correct network coding and decoding will be presented.

With reference to the second network coding and decoding example as sketched above in the background section, a correct network coding and decoding will now be presented, by using that U1 UL and U2 UL supports 2 and 4 bits per symbol, and U1 DL and U2 DL supports 4 and 6 bits per symbol. Again the network coding node chooses to transmit data by using the channel supporting the least bits, here 4.

This means that the network coded data would consist of 4 bits sent by the first network decoding node U1 102 to the network coding node 104 and 4 bits sent by the second network decoding node U2 106 to the network coding node 104.

Now, although taking 4 bits from the second data from U2 104 works well, this is more of a problem for U1 102 since the U1 UL only supported 2 bits per symbol.

The network coding node can process the data in different ways. One way of processing is to choose the modulation supporting the least bits per symbol of U1 UL and U2 UL, i.e. choose a QPSK modulation supporting 2 bits per symbol. Since the U1 DL and U2 DL support more bits per symbol, this choice of modulation level satisfies the worst of the 4 communication channels U1 UL, U2 UL, U1 DL and U2 DL. Thereafter the network coding node informs the first and second network decoding nodes about the processing of first and second data, i.e. inform said network decoding nodes that 2 bits per symbol is used for the network coding. Moreover, information about the coding and modulation of the network coded data is also sent to the first and second network decoding nodes, in this example a QPSK modulation supporting two bits per symbol is used.

Another way of processing is to add backlogged data to data sent by the first network decoding node U1, wherein the inserted backlogged data in this example consists of two bits previously transmitted from U1 in its UL, stored by the network coding node and intended to be received by U2. Since the processed first data as well as the second data have 4 bits per symbol, and the U1 DL and U2 DL support at least 4 bits per symbol, a 16 QAM modulation can then be performed on the network coded data.

As above, the network coding node has to inform the first network decoding node about that backlog insertion to the first data is performed, by which 4 bits per symbol is achieved. Also, information about the coding and modulation of the network coded data is sent to the network decoding nodes, here information about that a 16 QAM modulation is used for the network coded data.

A correct and more efficient network coding and network decoding can in this way be performed.

As pointed out above, a more detailed description of the correct network coding and decoding will be presented further down.

Figure 2:
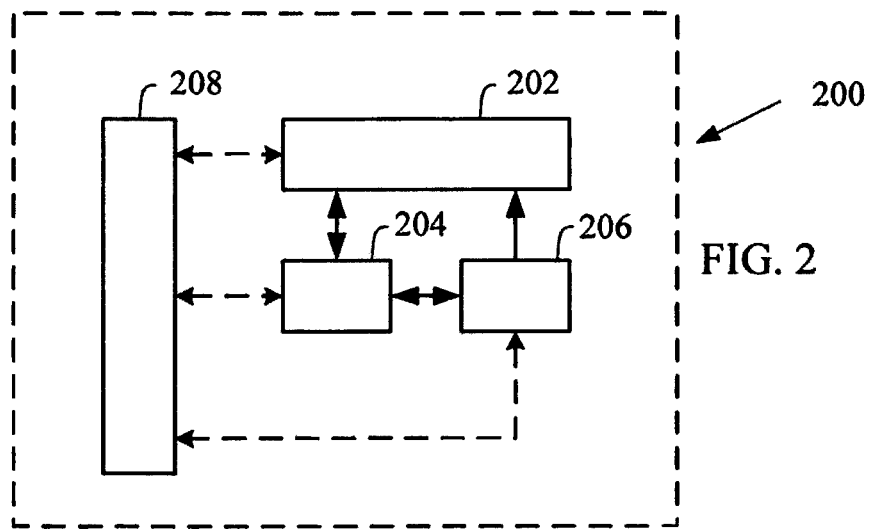
FIGS. 2 and 3 schematically illustrate network coding node and a network decoding node, respectively, according to some embodiments of the present invention.

A schematic presentation of a network coding node 200 is presented in FIG. 2, according to the some embodiments of the present invention. The network coding node 200 comprises a communication interface 202, a processing unit 204, and an encoding unit 206. Also, the network coding node 200 may comprise a control unit 208. The function of the various units will here only briefly be sketched, as they will further be described down below in more detail. The communication interface 202 is configured to receive coded and modulated data from a first and a second network decoding nodes, on a first U1 UL and second U2 UL channel, respectively. The processing unit 204 is configured to demodulate the received data, whereas the encoding unit 206 is configured to network encode data from first network decoding node with data from the second network decoding node.

The number of bits per symbol for each channel will be determined to be able to perform a proper network coding operation enabling network decoding by the network decoding nodes.

Figure 3:
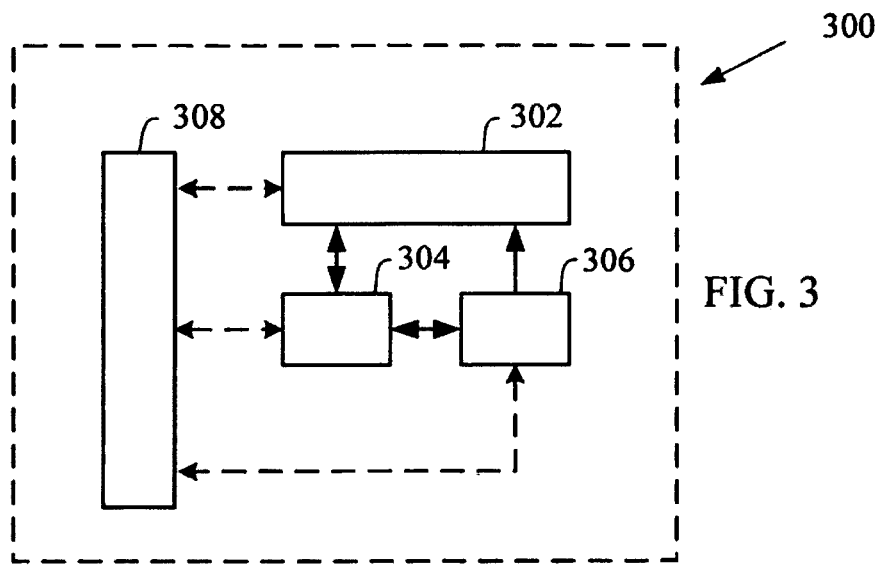

FIG. 3 presents a network decoding node comprising a communication interface 302, a processing unit 304, and a decoding unit 306. Also, the network decoding node 300 may comprise a control unit 308. The function of the various units will here only briefly be sketched, as they will further be described down below in more detail. The communication interface 302 is configured to receive coded and modulated network coded data from the network coding node 200, 104 over a U1 DL channel. The processing unit 304 is configured to modulate data to be sent, whereas the decoding unit 306 is configured to network decode data from the network coding node 104, 200.

Figure 4:
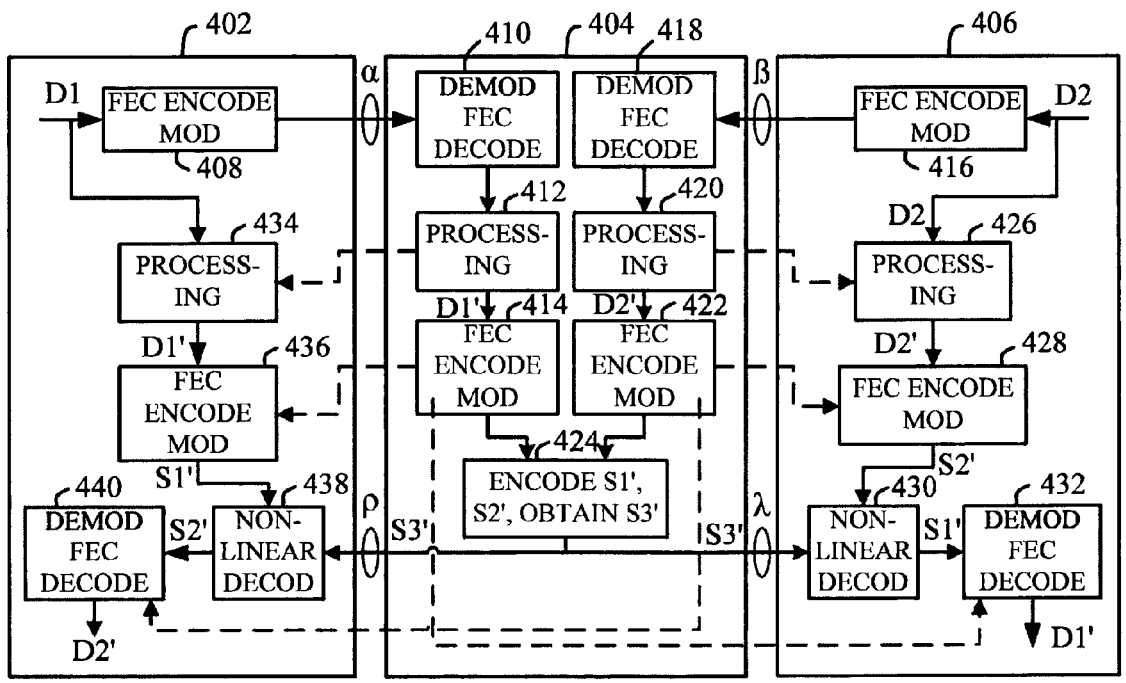
FIG. 4 schematically illustrates network system for multi-domain network coding, according to some embodiments of the present invention.

FIG. 4 schematically presents a coded bidirectional exchanging network system for multi-domain network coding. As mentioned hereinbefore when using multi-domain network coding symbols that are network coded together can have different modulations. The symbols that are network coded together can hence be modulated differently and modulation can therefore be chosen to allow various processing of data.

The system as schematically presented in FIG. 4 comprises a first network decoding node 402, a network encoding node 404 and a second network decoding node 406. The first and second network decoding nodes are denoted U1 and U2, respectively. Also, the network coding node is denoted node R. As above, the Up-Link channel between U1 and node R is denoted U1 UL, and the Up-Link channel between U2 and node R, U2 UL. Also, the Down-Link channel between node R and node U1, is denoted U1 DL, and the Down-Link channel between node R and U2, is denoted U2 DL.

Each channel has a Channel Quality Measure, CQM, for instance a Modulation and Coding Scheme, MCS, which dictates the coding and modulation that the channel can support. In FIG. 4 it is indicated the MCS of the two UL channels and the two DL channels. The MCS of the UL from U1 and U2 is denoted MCS α and MCS β respectively. The MCS of the DL to U1 and U2 are denoted MCS ρ and MCS λ, respectively.

Other quality indicators like Channel Quality Indicators, CQIs, Rank indicators, RIs, or Precoding Matrix Indicators, PMIs may as well be used as CQM in this invention.

Figure 5:
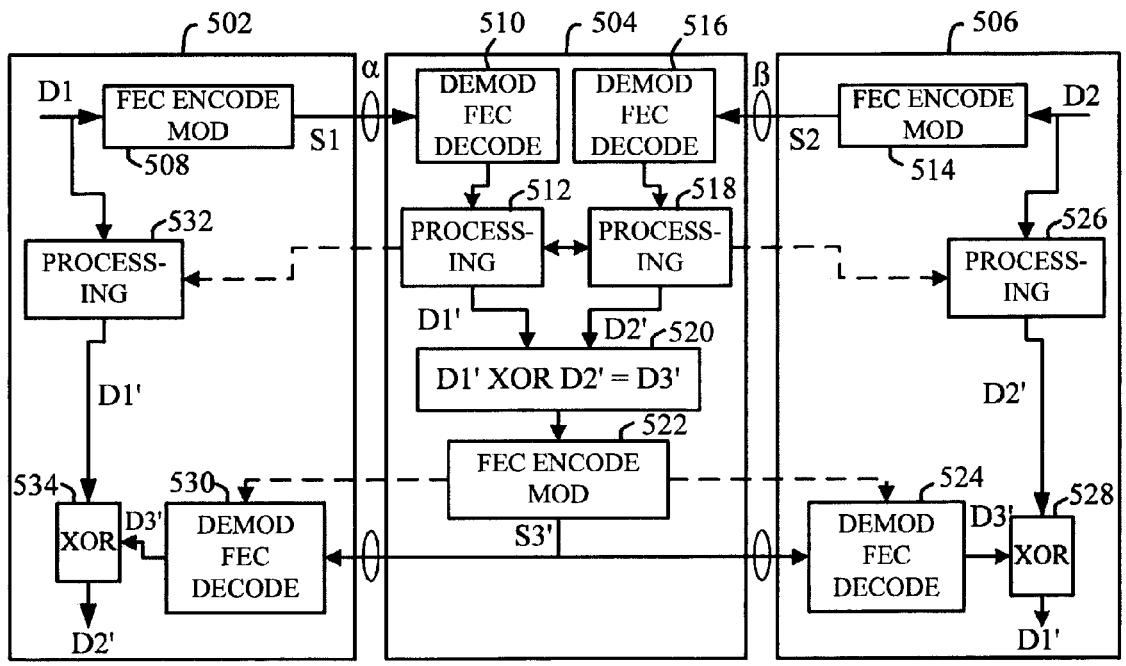
FIG. 5 schematically illustrates network system for bit-level network coding, according to some embodiments of the present invention.

FIG. 5 schematically presents a coded bidirectional exchanging network system for bit-level network coding, comprising a first network decoding node U1 502, a network encoding node, node R 504 and a second network decoding node U2 506. When using bit-level network coding symbols that are network coded together must have the same modulations. The symbols to be network coded together can however be processed such that the number of bits of data from U1 equals the number of bits from U2. This will be illustrated further below. Similar to the system as presented in FIG. 4, the channels between U1 and node R, and U2 and node R, are denoted U1 UL, U2 UL and U1 DL and U2 DL and support varying number of bits.

Each channel has a CQM, for instance a Modulation and Coding Scheme, MCS, which dictates the coding and modulation that the channel can support. In FIG. 5 it is indicated the MCS of the U1 UL and U2 UL being denoted MCS α and MCS β, respectively. The MCS that is supported by U1 DL and U2 DL is denoted MCS min (λ, ρ).

The task is now to determine how to process data received from U1 402, 502 and U2 406, 506 and to communicate the choice of processing to said nodes, U1 402, 502 and U2 406, 506 to enable correct decoding of network coded data to be received. Also, processing information is communicated allowing the network decoding nodes U1 402, 502 and U2 406, 506 to properly network decode the network coded data.

The task is thus to ensure that data transmitted by first and second network decoding nodes U1 and U2, are correctly processed and network coded together. A correct network coding allows for concatenation including backlog data, segmentation of data, and in some cases zero-padding to data, as will be further described below.

Figure 6:
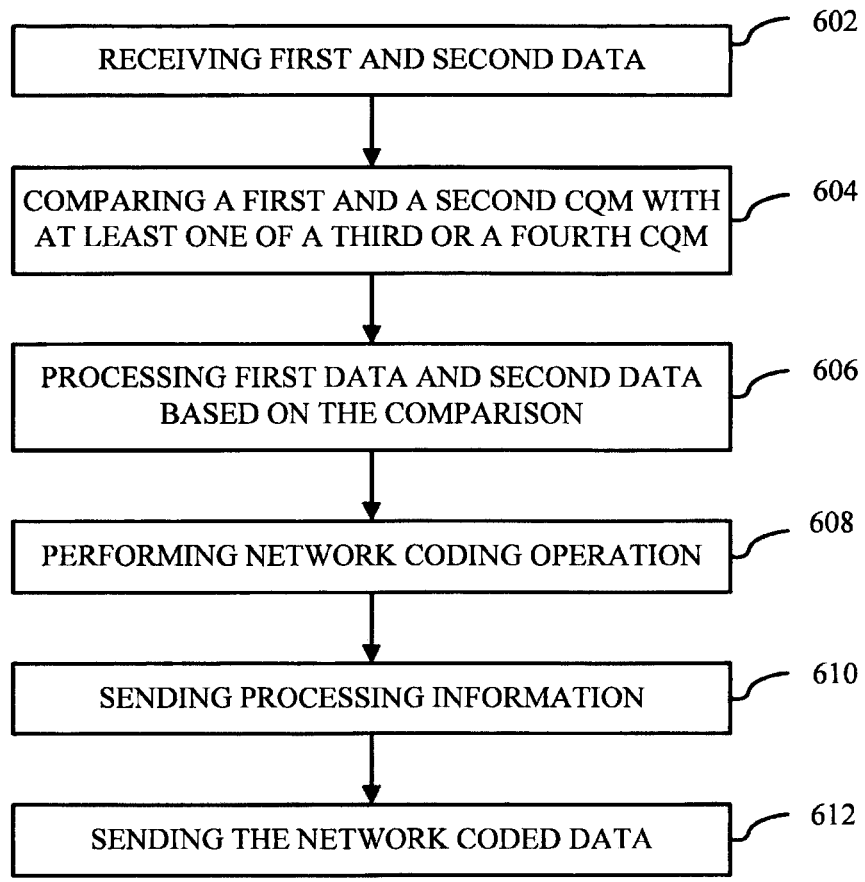
FIGS. 6-11 illustrate flow-charts of methods, according to some embodiments of the present invention.

A general method for network coding that is applicable to both multi-domain and bit-level network coding will first be presented with reference to FIG. 6, presenting a flowchart of method steps. Thereafter, a method specifically applicable to multi-domain will be presented with reference to flowchart 7A and 7B. In addition a flowchart for bit-level network coding will be presented with reference to FIGS. 8A and 8B.

The first step in FIG. 6 is receiving first and second data from a first and a second node, respectively, step 602. First data is coded and modulated using a first CQM and second data is coded and modulated using a second CQM. The next step is comparing the first and the second CQM with at least one of a third or a fourth CQM, step 604. The downlink channel between the network coding node and the first node has fourth CQM. Similarly, the downlink channel between the network coding node and the second node has third CQM.

Processing of first data and second data based on the comparison in step 604, is now performed in step 606, after which a network coding operation of data is performed in step 608. The network coding node then sends processing information to the first and second nodes, in step 610. Finally, network coded data is send to the first and second nodes in step 612.

Figure 7A:
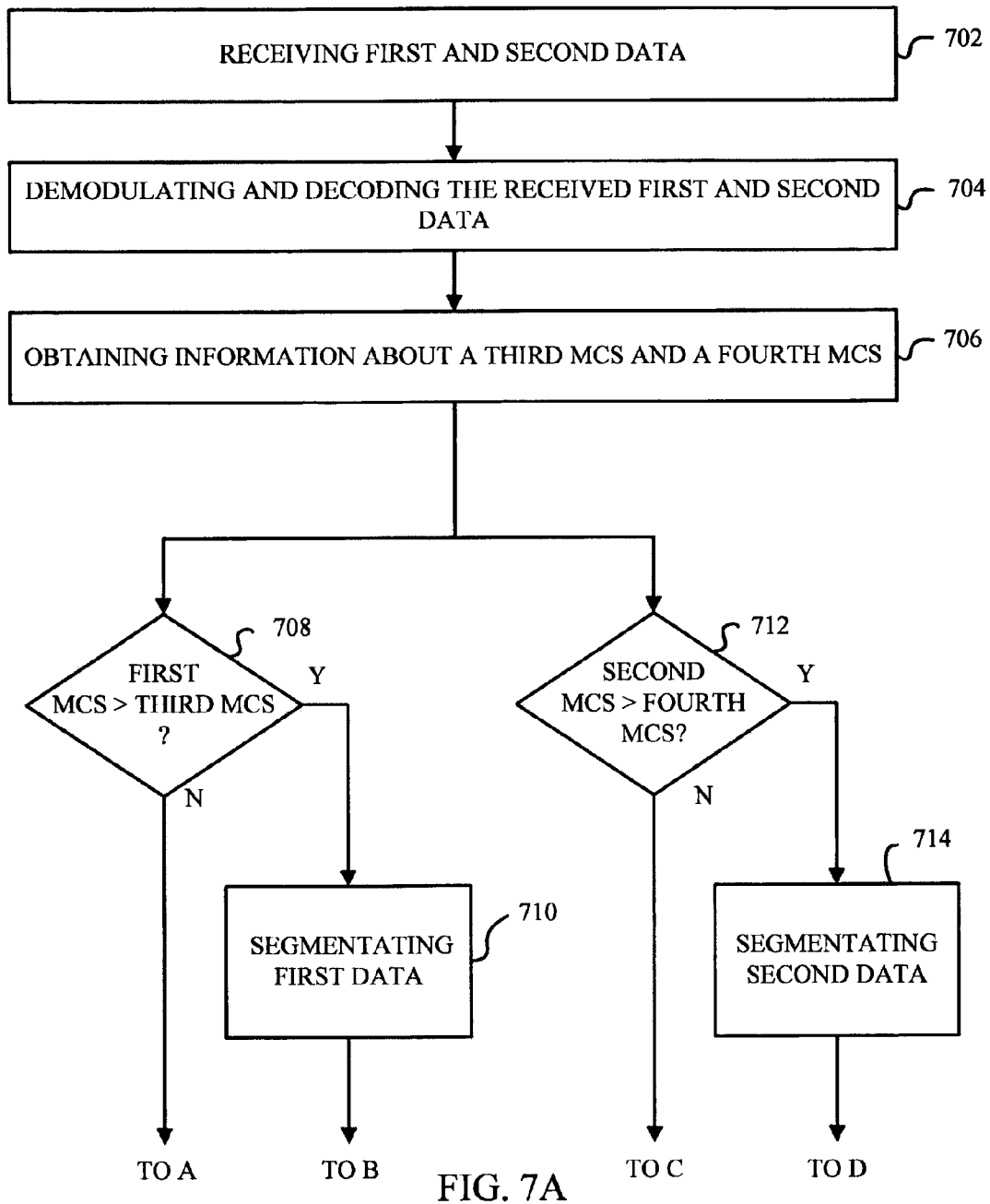
Figure 7B:
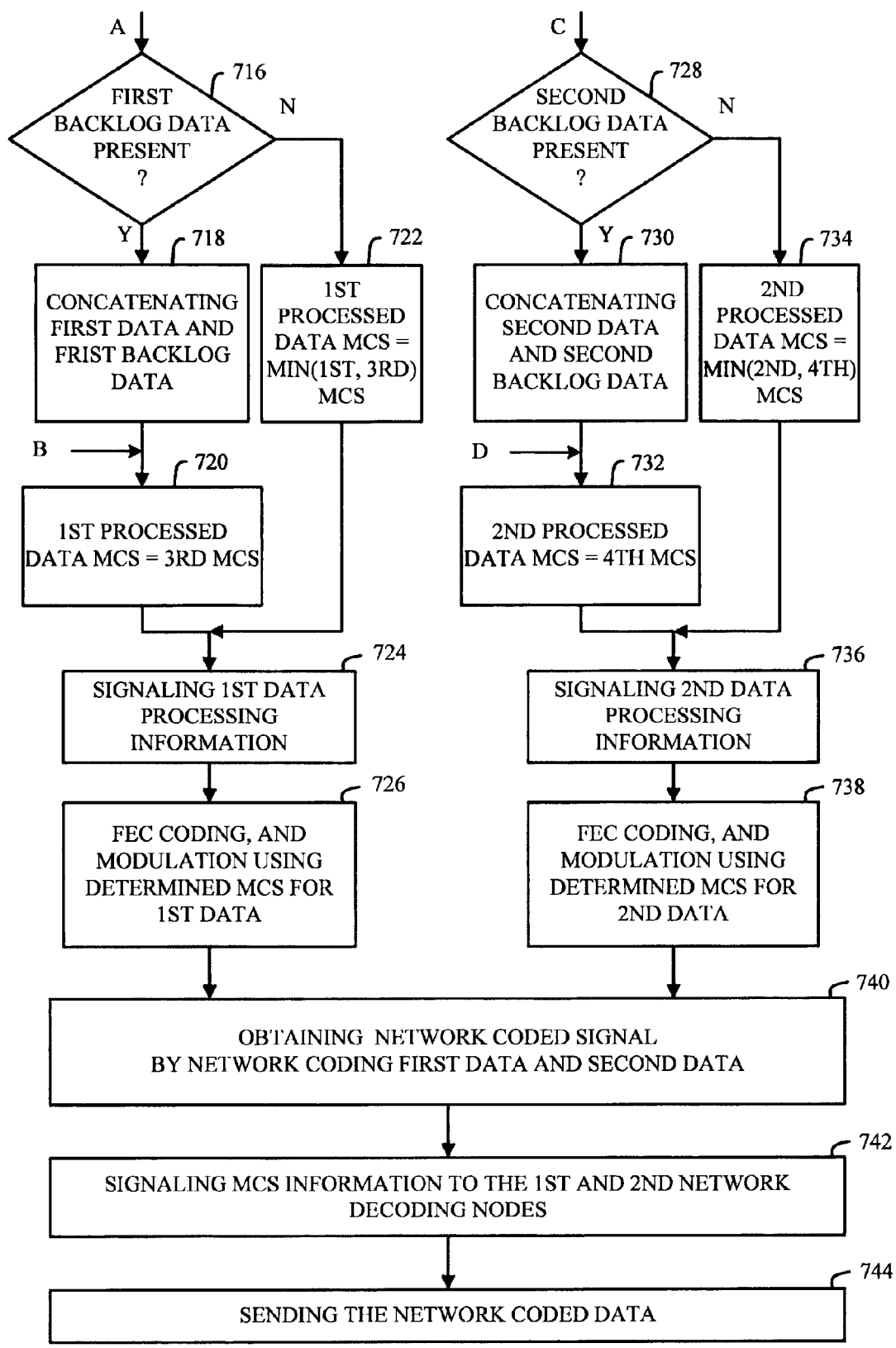

Now, a method for multi-domain network coding will now be presented with reference to FIGS. 7A and 7B, as well as to FIG. 4.

In 702, the network coding node 404 receives first and second data from the first and second network decoding node, respectively. The first data is coded and modulated with a first modulation and coding scheme, MCS α, and the second data is coded and modulated with a second modulation and coding scheme, MCS β.

Demodulation and decoding of the received first and second data according to the first modulation and coding scheme, MCS α, and the second modulation and coding scheme, MCS β, is performed in step 704. Referring to FIG. 4, said demodulation and Forward Error Correction (FEC) decoding of first data S1 is performed in 410, revealing demodulated and decoded first data D1. The demodulation and Forward Error Correction (FEC) decoding of second data S2 is performed in step 418, revealing demodulated and decoded second data D2.

In step 706, the network coding nodes obtain information about a fourth MCS that supports downlink communication between the network coding node and the first network decoding node, and information about a third MCS that supports downlink communication between the network coding node and the second network decoding node.

In a comparison step 708, it is determined whether the first MCS is higher than the third MCS, or not.

This comparison is performed to determine if more symbols are received from the first decoding node, than can be forwarded to the second decoding node. If the first MCS is higher than the third MCS, this means that the number of symbols to be transmitted have to be reduced since the channel cannot support a too high number of symbols.

In a corresponding step, step 712 it is determined whether the second MCS is higher than the fourth MCS, or not. In the case the first MCS is not higher than the third MCS, in step 708, the following step is determining whether previously received data from the first node is present in the network coding node or not, in step 716, i.e. whether first backlog data is present or not.

It is here thus determined whether there is backlog data to add to the first data if the third MCS can support a larger number of symbols.

In the case the second MCS is not higher than the fourth MCS, in step 712, the following step is determining whether previously received data from the second node is present in the network coding node or not, in step 728, i.e. whether second backlog data is present or not.

If it is now determined that first backlog data is present in step 716, first data is concatenated with first backlog data in step 718, up to the third MCS. In the following step the MCS for the processed first data is thus set to the third MCS, in step 720.

Likewise, if it is determined that second backlog data is present in step 728, second data is concatenated with second backlog data in step 730, up to the fourth MCS. In the next step the MCS for the processed second data is thus set to the fourth MCS, in step 732.

If on the other hand first backlog data is not present in step 716, the MCS for the processed first data is set to the minimum of the first and the third MCS in step 722.

The MCS thus reflects the amount of data which can be transmitted.

Again the corresponding applies for second data, if second backlog data is not present in step 728, the MCS for the processed second data is set to the minimum of the second and the fourth MCS in step 734.

Also, if it is determined that the first MCS is higher than the third MCS in step 708, segmentation of first data is performed in step 710, forming new first backlog data, after which step 720 is processed as described above. Thus, in case more symbols are received than can be transmitted, segmentation is performed.

For the second data, if it is determined that the second MCS is higher than the fourth MCS is step 712, segmentation of second data is performed in step 714, forming new second backlog data, after which step 732 is processed as described above.

Now having processed the first and second data according to any steps above, information about, or at least related to, the processing of first and second data is sent to the first 402 and second 406 network decoding nodes, respectively, in steps 724 and 736.

In FIG. 4, the processing of first data D1 obtaining processed first data D1' and processing of second data D2 obtaining processed second data D2' is performed in steps 412 and 420, respectively. Also, information about the processing of first and second data is indicated with broken lines from steps 412 and 420 to processing steps 434 and 426, respectively.

Having performed the processing of first and second data by the network coding node, the first and second data is FEC coded and modulated in steps 414, 726 and 422, 738, respectively, using the MCS as determined in the aforementioned steps. For first data the MCS is set in either step 720 or 722, and for second data the MCS is set in either step 732 or 734, obtaining coded and modulated first S1' and second S2' data.

The processed first and second data may thus be coded and modulated by using different MCS, since network coding is to be performed in the multi-domain on symbols rather than on bits. By multi-domain network coding first data S1' with second data S2', network coded data S3' is obtained in step 740.

In a subsequent step of the method for multi-domain network coding, information about the Modulation and Coding Scheme (MCS) that is to be used for DL transmission for the first and second data is sent to the second and the first network decoding node, respectively, in step 742. This is also indicated by broken lines between steps 414 and 432, and between steps 422 and 440.

Finally, the network coded data S3' is sent to the first 402 and second 406 network decoding nodes in step 744. This is illustrated in FIG. 4, by a line between step 424, and 438 and 430 of the first and the second network decoding nodes, respectively.

Method steps for embodiments of multi-domain network coding have thus been described with reference to FIGS. 4, 7A, and 7B.

As the present invention also related to bit-level network coding, method steps of such a network coding will now be described with reference to FIG. 5, and the flowchart of FIGS. 8A and 8B.

Within bit-level network coding symbols will be network coded together in a way similar to the multi-domain network coding. There are however differences. In bit-level network coding the symbols that will be network coded together must have exactly the same modulation. This implies that the number of bits of first data must be the same as the number of bits of second data.

Figure 8A:
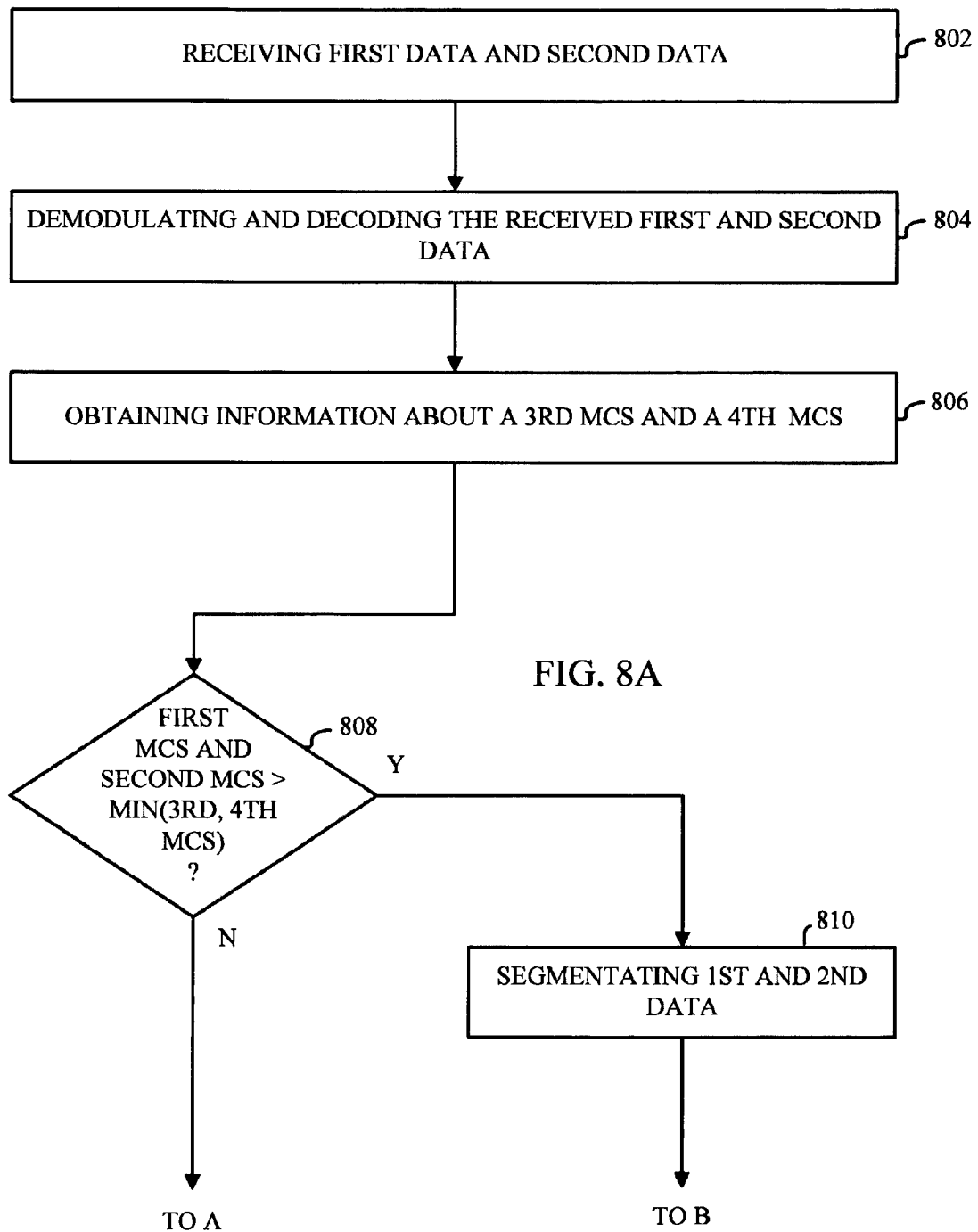
Figure 8B:
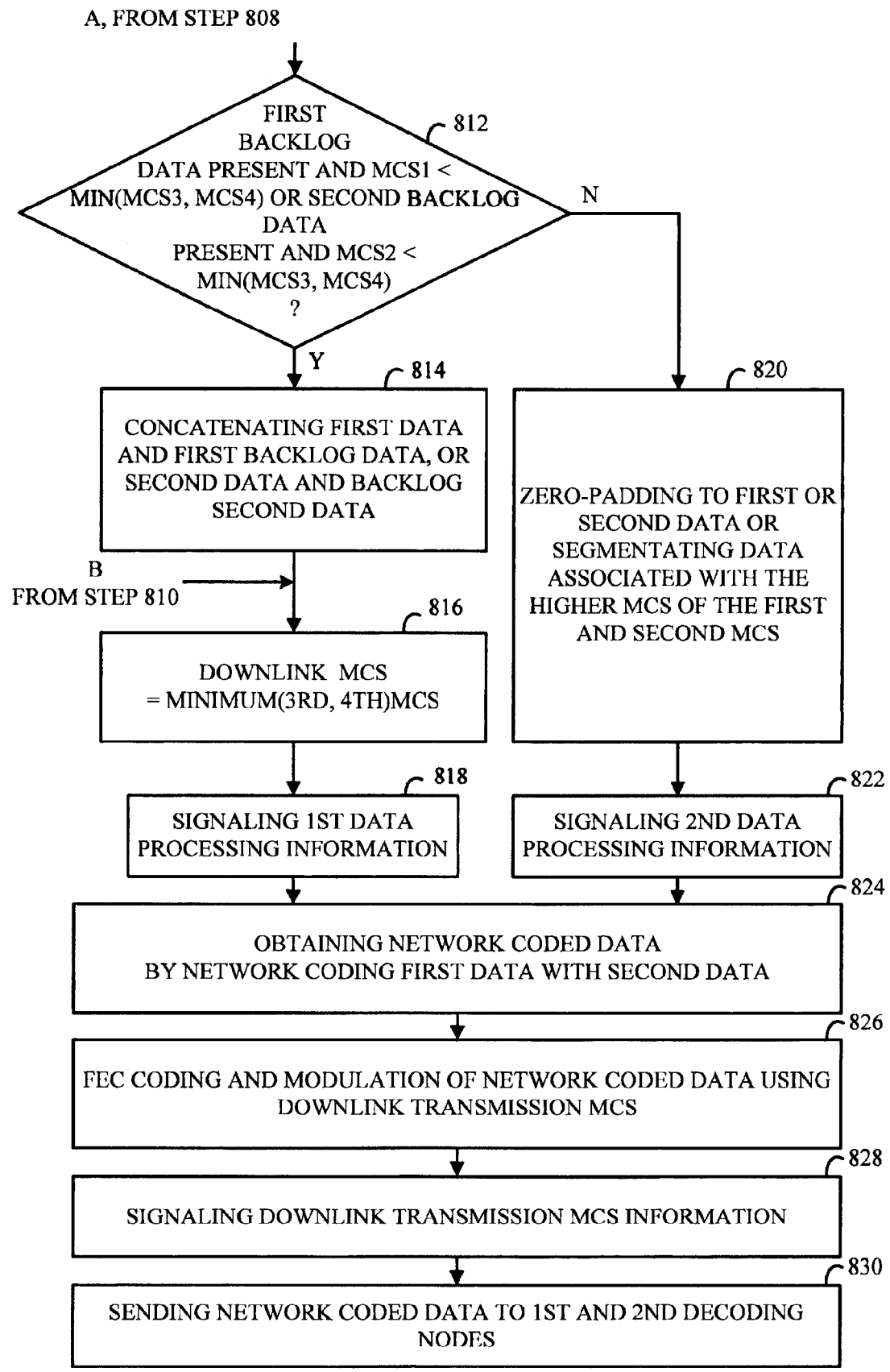

The first three steps in FIG. 8A correspond to the one of the flowchart as presented in FIG. 7A.

In 802, the network coding node 504 receives first S1 and second S2 data from the first 502 and second 506 network decoding node, respectively. The first data is coded and modulated with a first modulation and coding scheme, MCS α, and the second data is coded and modulated with a second modulation and coding scheme, MCS β.

Demodulation and decoding of the received first S1 and second S2 data according to the first modulation and coding scheme, MCS α, and the second modulation and coding scheme, MCS β, is performed in step 804. First and second decoded and demodulated data D1 and D2 are thus obtained.

Referring to FIG. 5, said demodulation and Forward Error Correction (FEC) decoding of first data is performed in 510, whereas the demodulation and Forward Error Correction (FEC) decoding of second data is performed in 516.

In step 806, the network coding nodes obtains information about a fourth MCS that supports downlink communication between the network coding node 504 and the first network decoding node 502, and information about a third MCS that supports downlink communication between the network coding node 502 and the second network decoding node 506.

In a following comparison step 808, it is determined whether the first and the second MCS is higher than the minimum of the third and fourth MCS, or not. It is thus determined whether the network coding node has received data from both network decoding nodes having more bits than the DL channels can support.

In the case the first and the second MCS are higher than the minimum of the third and fourth MCS, in step 808, the following step is to segment the first D1 and second D2 data to the minimum of the third and fourth MCS in step 810.

If on the other hand the first and the second MCS are not higher than the minimum of the third and fourth MCS, in step 808, the following step is to determine whether 1) there is previously received first backlog data present at the network coding node 502 and the first MCS is smaller than the minimum of the third and fourth MCS, or whether 2) there is previously received second backlog data present at the network coding node 502 and the second MCS is smaller than the minimum of the third and fourth MCS, in step 812.

In the case the question in step 812 is answered positively, and the first backlog data is present, which means that more bits can be sent than were received, the next step is to concatenate first data with first backlog data in step 814. In the case step 812 is positive, and second backlog data is present, the next step is to concatenate second data with second backlog data in step 814.

Thereafter, the MCS for the DL transmission is set to the minimum of the third and the fourth MCS, in step 816.

Information about, or at least related to, the processing of the first or second data is sent to the first 502 and second 506 network decoding nodes, respectively, in step 818.

In the case the question in step 812 is answered negatively, various options of processing of the first and second data exist. If first backlog data is not present at the network coding node 504 but the first MCS is smaller than the minimum of the third and the fourth MCS, zero-padding is performed to the first data up to the minimum of the third and the fourth MCS in step 820. Similarly, if second backlog data is not present at the network coding node 504 but the second MCS is smaller than the minimum of the third and the fourth MCS, zero-padding is performed to the second data up to the minimum of the third and the fourth MCS in step 820. If however, one of the first or the second MCS is higher than the minimum of the third and the fourth MCS, the corresponding data is segmented to the minimum of the third and the fourth MCS in step 820, forming new backlog data.

If both the first and the second MCS and smaller than the minimum of the third and fourth MCS, first data and second data network coded together may be sent by the network coding node 504 with a MCS smaller than the minimum of the third and fourth MCS. In this case, the MCS to choose for the DL transmission would be the minimum of all four channels, i.e. the minimum of the first, second, third and fourth MCS.

In step 822, information about, or at least related to, the processing of the first or second data is now sent to the first 502 and second 506 network decoding nodes, respectively, enabling a correct network decoding.

Sending information about the processing of first and second data, as illustrated in steps 512 and 518, respectively, is illustrated in FIG. 5 by the broken lines between 512 and 532 for first data, and between 518 and 526 for the second data.

Network coded data D3' is obtained by performing network coding of the processed first data D1' and processed second data D2' in step 824 in FIG. 8 and in step 520 in FIG. 5.

As the bit-level network coding performs coding of certain bits with other bits, the number of first bits has to be equal to the number of second bits. One example of bit-level network coding the Exclusive OR operation or XOR which yields a "0" when two equal bits are coded together and a "1" when two unequal bits are coded. For example, if D1=1001 and D2=0101 the coded data D3=1100. Needless to say other network coding operations may be used instead.

Having obtained network coded data, Forward Error Correction (FEC) coding and modulation according to the chosen Modulation and Coding Scheme (MCS) is now performed in step 826. This is also illustrated in step 522 of FIG. 5.

After FEC coding and modulation, information about processing of the network coded data S3' is sent to the first 502 and second 506 network decoding nodes, in step 828.

Thereafter, the coded and modulated network coded data S3' is sent to the first and second network decoding nodes in step 830. The MCS of the DL channel between the network coding node 504 and the first and second network decoding nodes 502 and 506 may the weakest of the DL channels, as set in step 816 above. Alternatively, the MCS for the DL may be the weakest of the UL channels and the DL channels, as mentioned above. The weakest is in this sense the one with the least number of bits.

Having discussed the network coding node 404 and 504 in some detail, the network decoding nodes 402, 502 and 406, 506 will now be described. The network decoding nodes receive information about processing and coding and modulation of data, such that the decoding nodes can network decode the network encoded data and retrieve the wanted data. The first network decoding nodes seeks the second data and the second network decoding node seeks the first data.

Figure 9:
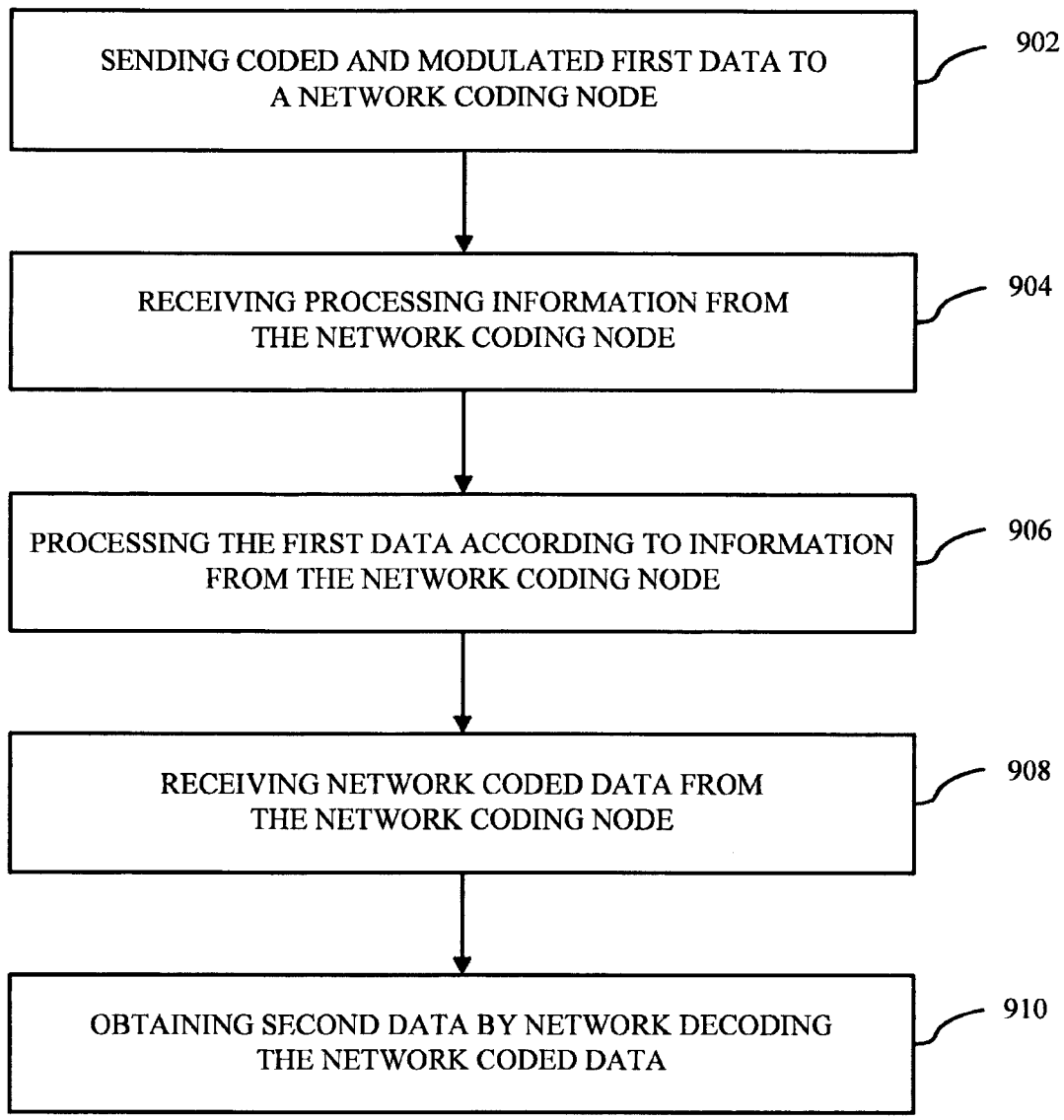

A general method that is applicable for both multi-domain and bit-level network decoding is illustrated in the flowchart of method steps in FIG. 9. Although reference will most often be made to the first network decoding nodes 402, 502 of FIGS. 4 and 5, it applies equally well to the second network decoding node 404, 504, with duly changes, as they have the same or corresponding function and are in this sense equivalent with each other.

In FIG. 9, the first step is sending coded and modulated first data, destined to the second network decoding node 406, 506, to the network coding node 404, 504, in step 902. Then, the network decoding node 402, 502 receives information about processing of the first data from the network coding node 404, 504, in step 904. The second network decoding node here receives information about processing of the second data from the network coding node 404, 504.

The following step is to process the first data in step 906 according to information as received from the network coding node 404, 504. Processing may involve segmentation of first data, or performing concatenation of first data with a priori known first data, corresponding to first backlog data, according to the processing as performed by the network coding node 404, 504.

Then the network decoding node 402, 502 receives network coded data from the network coding node 404, 504, in step 908. Finally, in step 910, the first network decoding node 402, 502 obtains the second data by network decoding the network coded data. Similarly, the second network decoding node 406, 506 obtains the first data by network decoding the network coded data.

Figure 10:
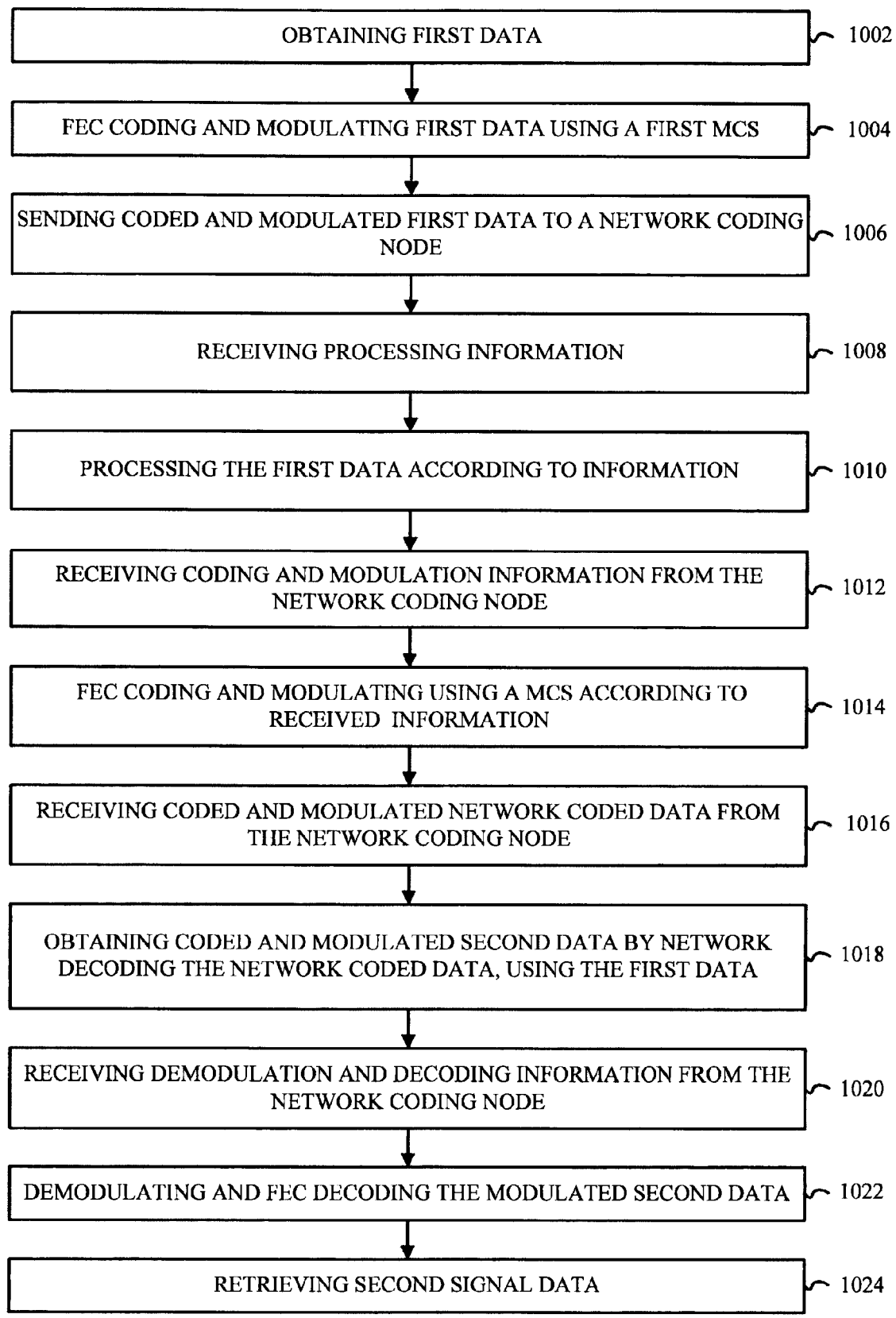

With reference to FIG. 10, illustrating a flowchart of method steps, a method for multi-domain network decoding will now be described. Reference will here be given to FIG. 4 as this figure illustrates a communication system for multi-domain network coding and decoding.

In the step 1002 the first network decoding node 402 obtains first data D1, for further sending to the network coding node 404. In step 1004, data D1 is Forward Error Correction (FEC) coded and modulated using a first Modulation and Coding Scheme (MCS) obtaining S1. This is also illustrated in step 408 of FIG. 4.

The network coding node may previously communicate an estimation of which MCS to choose as the first MCS.

Now, having obtained FEC coded and modulated first data, said data is sent to the network coding node 404 in step 1006, where the first data is destined to the second network decoding node. The first MCS is in FIG. 4 denoted MCS α.

In the second network decoding node 406 FEC coding and modulation by using MCS β is performed in step 416, obtaining S2 after which the data is sent to the network coding node 404 in step 1006.

Thereafter the first network decoding node 402 receives processing information about how to process the first data D1 from the network coding node 404, in step 1008.

In step 1010, the first network decoding node 402 processes the first data D1 according to the information as received from the network coding node 404. The processing by the first network decoding node may involve segmentation of first data, or concatenation of first data and a priori known first data corresponding to first backlog data, according to the processing as performed by the network coding node 404.

The first network decoding node 402 also receives coding and modulation information from the network coding node 404 in step 1012, on which CQM or MCS to use in the following step of FEC coding and modulation of the processed first data D1' obtaining S1', in step 1014.

Then, coded and modulated network coded data S3' is received from the network coding node 404, in step 1016.

The received coded and modulated network coded data S3' is then network decoded in steps 438 and 1018, using the coded and modulated processed first data S1', obtaining coded and modulated second data S2'.

The first network decoding node 402 then receives demodulation and decoding information from the network coding node 404 in step 1020 on how to de modulate and decode the modulated and FEC coded processed second data.

By using the received demodulation and decoding information as received in steps 1020, the second data S2' is demodulated and FEC decoded in step 440 and 1022, obtaining processed second data D2'.

Having demodulated and decoded the processed coded and modulated second data, the processed second data is retrieved in step 1024. Here the processed second data is denoted D2', where the "'" character corresponds to the processing of the second data D2 as performed by the network coding node 404.

Figure 11:
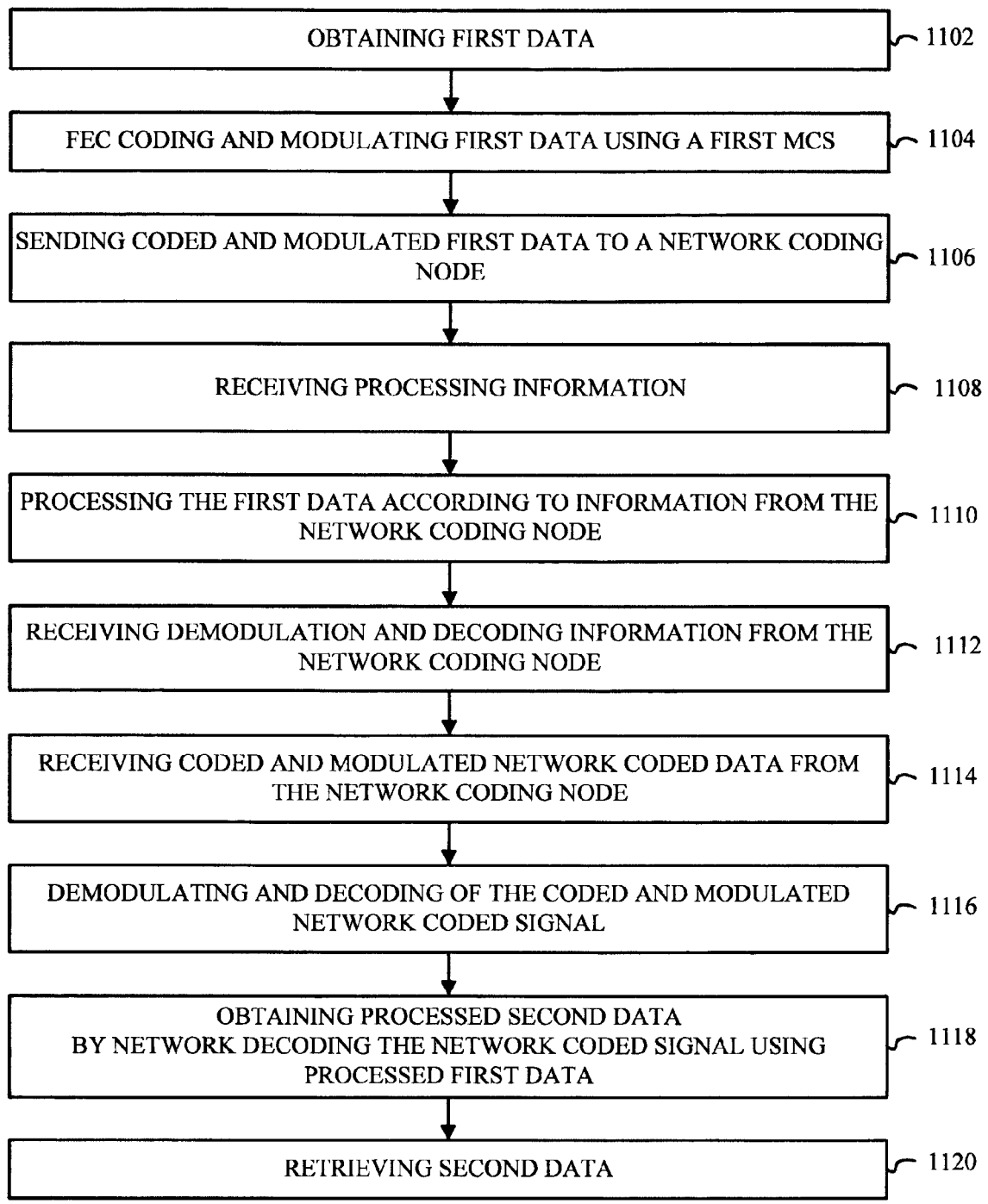

Now, referring to FIG. 11, illustrating a flowchart of method steps, a method for bit-level network decoding will now be described. Reference will here be given to FIG. 5 as this figure illustrates a communication system for bit-level network coding and decoding.

As the first four steps of FIG. 11, i.e. steps 1102, 1104, 1106 and 1108 are the same as the ones of FIG. 10, i.e. 1002, 1004, 1006 and 1008, with duly changes reference is made to steps 1002-1008 for steps 1102-1108.

In step 1110, the first network decoding node 502 processes the first data D1 according to information from the network coding node 504, obtaining S1.

In step 1110, the first network decoding node 502 processes the first data according to the information as received from the network coding node 504. The processing by the first network decoding node may involve segmentation of first data, concatenation of first data and a priori known first data corresponding to first backlog data, or performing zero-padding to the first data, according to the processing as performed by the network coding node 504.

The first network decoding node 502 then receives decoding and demodulation information from the network coding node 504 in step 1112, on how to FEC decode and demodulate network coded data S3' to be received.

Accordingly, in step 1114 the first network decoding node 502 receives coded and modulated network encoded data S3' from the network coding node 504.

The coded and modulated network encoded data S3' is then decoded and demodulated in step 1116 according to the information as received from the network coding node in step 1112. Network encoded data D3' is here revealed.

By network decoding the network encoded data D3', processed second data D2' is now obtained in step 1118 by using the processed first data D1' in step 534, 1118.

The second data D2 can thus be retrieved from the processed second data D2' in step 1120.

It has here been demonstrated how to achieve second data from network data of first and second data.

As mentioned above, the method for network decoding applies equally well to the second network decoding node 506. In fact, in order to complete the exchange of information in the form of first and second data between a first 402, 502 and a second 406, 506 network decoding node via a network coding node 404, 504, network decoding has to be performed in both network decoding nodes. By using the FIGS. 4 and 5 the reader can easily find the correspondence between the first and the second network decoding node.

The network coding node 200 as schematically illustrated in FIG. 2 and as briefly introduced above, will now be described in some detail.

The network coding node (104, 200, 404, 504) is configured for multidirectional communication within a communication system with at least a first 102, 300, 402, 502 and a second network decoding node 106, 300, 406, 506. It is further configured for network coding in the communication system, wherein the uplink channel between the first network decoding node and the network coding node, and between the second network decoding node and said network coding node, has a first and a second Channel Quality Measure, CQM, respectively, and wherein the downlink channel between the network coding node and the first network decoding node, and the network coding node and the second network decoding node, has a fourth and a third CQM, respectively. Moreover, the network coding node comprises a transceiver 202, in the form of a communication interface configured to receive first data coded and modulated based on the first CQM, and second data coded and modulated based on the second CQM. The network coding node further comprises a data processing unit 204 that is operatively connected to the transceiver 202, and configured to compare the first and the second CQM with at least one of the third and the fourth CQM, to process the first and second data based on the comparison of the first and second CQM with at least one of the third and the fourth CQM. In addition, the network coding node further comprises an encoding unit 206 that is operatively connected to the data processing unit 204 and to the transceiver 202, and configured to obtain network coded data by performing a network encoding operation of the processed first data with the processed second data. The transceiver 202 is also configured to send the network coded data to the first and the second network decoding nodes, and to send information about the processing of the first and second data to the first 102, 300, 402, 502 and second 106, 300, 406, 506 network decoding node, respectively.

Also, the network coding node may comprise a control unit 208 controlling the function of the units as comprised within the network coding node.

The network coding node may be a User Equipment, UE, a base station or a relay node.

Now, the network decoding node 300 as schematically illustrated in FIG. 3 and as briefly introduced above, will now be described in some detail. The network decoding node 102, 106, 300, 402, 406, 502, 506 for network decoding in a communication network, is configured for communication with at least one network coding node 104, 200, 404, 504, wherein the uplink channel between the network decoding node and the network coding node has a first CQM. The network decoding node comprises a transceiver 302 that is configured to send to the network coding node 104, 200, 404, 504 first data coded and modulated based on the first CQM, and to receive from the network coding node information about processing of the first data. The network decoding node also comprises a data processing unit 304 that is operatively connected to the transceiver 302 and configured to process the first data according to received information about how to process the first data. The network decoding unit also comprises a decoding unit 306 that is operatively connected to the transceiver 302 and the data processing unit 304, and configured to obtain second data by performing a network decoding operation of the received network coded data, using the processed first data.

As the network coding node, the network decoding node may be a User Equipment, UE, a base station or a relay node.

The embodiments of the present invention provide at least the following main advantages:

By providing a generic method for supporting coded multidirectional relaying in asymmetric channel conditions, a correctly working network coding and decoding communication system under general and not only specific conditions is provided.

It is an advantage that embodiments enable correct detection, network decoding and signal retrieval, thus enhancing the system reliability.

It is a further advantage that embodiments allow an efficient usage of the transmission channels through choosing suitable Modulation and Coding Schemes, MCS, thereby increasing the system throughput.

As the proposed methods are easy to implement and use, complexities possibly introduced by a network coding operation are eliminated.

It must be emphasized that the present invention can be varied in many ways. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

It is made clear that presented embodiments may well be combined forming new embodiments not explicitly described herein.

In the claims, the term "comprises/comprising" does not exclude the presence of other elements or steps. Additionally, although individual features may be included in separate claims, these may be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Although the present invention has been described above with reference to (a) specific embodiment(s), it is not intended to be limited to the specific form set forth herein. Rather, the invention is limited only by the accompanying claims and, other embodiments than the specific above are equally possible within the scope of these appended claims.

The invention claimed is:

1. A method in a network coding node for network coding in a communication system, wherein the network coding node is configured for multi-directional communication with at least a first and a second network decoding node, wherein the uplink channel between the first network decoding node and said network coding node, and between the second network decoding node and said network coding node, has a first and a second Channel Quality Measure (CQM) respectively, and the downlink channel between the network coding node and the first network decoding node, and between said network coding node and the second network decoding node, has a fourth and a third CQM, respectively, the method comprising:

receiving first data coded and modulated based on the first CQM, and second data coded and modulated based on the second CQM;

comparing the first CQM with the third CQM or with the minimum of the third and the fourth CQM, and comparing the second CQM with the fourth CQM or with the minimum of the third and the fourth CQM;

processing the received decoded first and second data based on the comparisons, wherein the processing comprises at least one of segmentation of the first data, segmentation of the second data, concatenation of the first data and first backlog data, concatenation of the second data and second backlog data, and zero-padding to first or second data;

obtaining a network coded data by performing a network coding of the processed first data with the processed second data, wherein the network coding has a property that the processed second data can be obtained from the processed first data and the network coded data, and that the processed first data can be obtained from the processed second data and the network coded data; and sending the obtained network coded data to the first and second network decoding nodes and information about the processing of the first and the second data to the first and the second network decoding nodes, respectively.

2. The method according to claim 1, wherein the processing comprises performing segmentation of the first data to the third CQM, if the first CQM is higher than the third CQM, and/or segmentation of the second data to the fourth CQM, if the second CQM is higher than the fourth CQM.

3. The method according to claim 1, wherein the processing comprises performing concatenation of the first data and first backlog data when the first CQM is lower than the third CQM, wherein the first backlog data is previously received from the first network decoding node and stored at the network coding node.

4. The method according to claim 3, wherein performing the concatenation is based on whether the first backlog data is delay tolerant or delay intolerant.

5. The method according to claim 4, wherein performing the concatenation of first data and delay intolerant first backlog data comprises prioritizing delay intolerant first backlog data before the first data, and wherein performing the concatenation of first data and delay tolerant first backlog data comprises prioritizing the first data before the delay tolerant first backlog data.

6. The method according to claim 1, wherein the processing comprises performing concatenation of the second data and second backlog data, when the second CQM is lower than the fourth CQM, wherein the second backlog data is previously received from the second network decoding node and stored at the network coding node.

7. The method according to claim 6, wherein performing the concatenation in processing is based on whether the second backlog data is delay tolerant or delay intolerant.

8. The method according to claim 7, wherein performing the concatenation of the second data and the delay intolerant second backlog data comprises prioritizing the delay intolerant second backlog data before the second data, and wherein performing concatenation of the second data and the delay tolerant second backlog data comprises prioritizing the second data before the delay tolerant second backlog data.

9. The method according to claim 1, wherein the processing comprises performing segmentation of the first or the second data, in the case the first or the second CQM, respectively, is higher than the minimum of the third and the fourth CQMs.

10. The method according to claim 9, wherein the comparing further comprises comparing the first CQM with the second CQM, and wherein the processing comprises processing the first and the second data based on the comparison of the first CQM and the second CQM, when the first and the second CQMs are lower than the minimum of the third and the fourth CQM.

11. The method according to claim 10, wherein the processing comprises concatenating the first data with first backlog data to the second CQM, in presence of first backlog data and in the case the first CQM is lower than the second CQM, wherein the first backlog data is previously received from the first network decoding node and stored at the network coding node.

12. The method according to claim 10, wherein the processing comprises zero-padding the first data to the second CQM, in the case the first CQM is lower than the second CQM.

13. The method according to claim 1, wherein the processing comprises concatenating the first data with first backlog data or the second data with second backlog data, in the case the first or the second CQM, respectively, is lower than the minimum of the third and the fourth CQMs, wherein the first or second backlog data is previously received from the first or second network decoding node, respectively, and stored at the network coding node.

14. The method according to claim 1, wherein the processing comprises zero-padding the received first or second data to the minimum of the third and the fourth CQM, if the first or second CQM, respectively, is lower than the minimum of the third and the fourth CQMs.

15. A network coding node for multidirectional communication with at least a first and a second network decoding node in a communication system, the network coding node being configured for network coding in the communication system, wherein an uplink channel between the first network decoding node and the network coding node, and between the second network decoding node and said network coding node, has a first and a second Channel Quality Measure (CQM) respectively, and wherein a downlink channel between the network coding node and the first network decoding node, and the network coding node and the second network decoding node, has a fourth and a third CQM, respectively, the network coding node comprising:

a transceiver, configured to receive first data coded and modulated based on the first CQM, and second data coded and modulated based on the second CQM;

a data processing unit operatively connected to the transceiver, and configured to compare the first CQM with the third CQM or with the minimum of the third and the fourth CQM, compare the second CQM with the fourth CQM or with the minimum of the third and the fourth CQM, and to process the decoded first and second data based on the comparisons, wherein the processing comprises at least one of segmentation of the first data, segmentation of the second data, concatenation of the first data and first backlog data, concatenation of the second data and second backlog data, and zero-padding to first or second data; and an encoding unit operatively connected to the data processing unit and to the transceiver, and configured to obtain network coded data by performing a network encoding operation of the processed first data with the processed second data;

wherein the transceiver further is configured to send the network coded data to the first and the second network decoding nodes, and to send information about the processing of the first and second data to the first and second network decoding nodes, respectively.

16. The network coding node according to claim 15, wherein the network coding node comprises any one of a User Equipment (UE), a base station, or a relay node.

* * * * *